United States Patent [19]

Ricoult

[11] Patent Number: 6,046,123
[45] Date of Patent: Apr. 4, 2000

[54] GLASSES WITH A HIGH REFRACTIVE INDEX AND THEIR USE AS SEGMENTS OF MULTIFOCAL CORRECTIVE LENSES

[75] Inventor: Daniel L. G. Ricoult, Palaiseau, France

[73] Assignee: Corning S.A., Corning, N.Y.

[21] Appl. No.: 09/155,239

[22] PCT Filed: Mar. 25, 1997

[86] PCT No.: PCT/US97/04984

§ 371 Date: Sep. 22, 1998

§ 102(e) Date: Sep. 22, 1998

[87] PCT Pub. No.: WO97/36834

PCT Pub. Date: Oct. 9, 1997

Related U.S. Application Data

[60] Provisional application No. 60/017,499, May 10, 1996.

[30] Foreign Application Priority Data

Apr. 2, 1996 [FR] France .................................. 96 04117

[51] Int. Cl.$^7$ ............................. C03C 3/068; C03C 3/072
[52] U.S. Cl. .............................. 501/75; 501/78; 501/903; 351/164; 351/168; 351/172
[58] Field of Search .................................. 501/75, 78, 903

[56] References Cited

U.S. PATENT DOCUMENTS

| 4,211,569 | 7/1980 | Hares et al. . |
|---|---|---|
| 4,351,906 | 9/1982 | Boudot et al. . |
| 4,562,162 | 12/1985 | Sagara . |
| 4,824,809 | 4/1989 | Grabowski et al. . |
| 5,162,826 | 11/1992 | Morgan . |

FOREIGN PATENT DOCUMENTS

| 2 323 648 | 4/1977 | France . |
|---|---|---|
| 2 559 144 | 8/1985 | France . |
| 43 01 057 | 3/1994 | Germany . |
| 1-308843 | 12/1988 | Japan . |

*Primary Examiner*—Karl Group
*Attorney, Agent, or Firm*—Milton M. Peterson

[57] ABSTRACT

The invention concerns glasses characterized by the fact that they have a refractive index higher than 1.740; a dilatation coefficient α, between 25 and 300° C., between 65 and 70×10$^{-7}$/°C.; and a Littleton point not exceeding 635° C. but higher than 600° C.; they have the following composition, expressed in weight percent of oxides:

| | |
|---|---|
| $SiO_2$ | 23–32.0 |
| $Al_2O_3$ | 1.5–5.0 |
| $B_2O_3$ | 5–9.0 |
| PbO | 43–54.0 |
| $Li_2O$ | 0–0.5 |
| $Na_2O$ | 0–1.0 |
| $K_2O$ | 0–1.0 |
| with $Li_2O + Na_2O + K_2O$ | <1.0 |
| BaO + SrO | 4–9.0 |
| $TiO_2$ | 0–4.0 |
| $ZrO_2$ | 0–2.0 |
| $La_2O_3$ | 0–3.0 |
| $Nb_2O_5$ | 0–3.0 |
| $As_2O_3$ | 0–0.3 |
| $Sb_2O_3$ | 0–0.4 |
| with $ZrO_2 + La_2O_3 + Nb_2O_5$ | 1.5–4.0 |

Use for the production of segments to be used in the manufacture of multifocal lenses, particularly photochromic.

5 Claims, No Drawings

GLASSES WITH A HIGH REFRACTIVE INDEX AND THEIR USE AS SEGMENTS OF MULTIFOCAL CORRECTIVE LENSES

This application claims the benefit of U.S. Provisional Application No. 60/017,499 filed May 10, 1996, entitled "Glasses With a High Refractive Index and Their Use As Segments of Multifocal Corrective Lenses".

BACKGROUND OF THE INVENTION

Glasses with a high refractive index and their use as segments of multifocal corrective lenses.

The present invention pertains to optical glasses with a high refractive index, which can be used particularly for the manufacture of segments used in the manufacture of multifocal corrective lenses. These multifocal lenses comprise a principal glass lens and one or more glass segments which are fused to it and whose refractive indices, which are higher than that of the principal lens, make it possible to obtain zones with higher corrective power. Such segments are normally fused to tie ophthalmic lens with a thermal fusing treatment bringing the whole constituted by the, principal lens and the segment to a temperature near the softening point of the two glasses which make it up. In this manufacturing method, the glass in the segment must have characteristics of dilatation and viscosity in the vicinity of the softening temperature which are close to those of the glass forming the principal lens.

Glasses with a high refractive index which are appropriate for the production of segments of multifocal lenses have already been described in the past. One example is U.S. Pat. No. 4,351,906, which describes the glasses whose weight composition includes 28–32.5% $SiO_2$, 28.5–34% PbO, 0–1% $Li_2O$, 2–9% NaO, 0–4% $K_2O$, 0–22% BaO, 0–20% $La_2O_3$, 0–4% ZnO, 2–6.5% $ZrO_2$, 0–9% $TiO_2$, and 0–10% $Nb_2O_5$ with, as supplementary conditions, 4%<$Li_2O$+$Na_2O$+$K_2O$<10.5%, 14%<BaO+$La_2O_3$<22% and 6%<$ZrO_2$+$TiO_2$+$Nb_2O_5$<17%. The corresponding glasses have a dilatation coefficient (in the range of 25–300° C.) between 90 and 98×10$^{-7}$/°C., a softening point between 640 and 700° C., and a refractive index between 1.745 and 1.771. The disadvantage of these glasses is that they have high dilatation values and a high softening point.

U.S. Pat. No. 4,211,569 also describes glasses which are compatible with the manufacture of segments for ophthalmic lenses. Their characteristics are a dilatation coefficient (in the range of 25–300° C.) between 60 and 66×10$^{-7}$/°C., a softening point between 620 and 645° C., and a refractive index between 1.58 and 1.71. Their composition is in the following range:

30–50% $SiO_2$, 4–8% $B_2O_3$, 25–50% PbO, 0–2% $Li_2O$, 0–3% $Na_2O$, 4–9% BaO, 0–3% $La_2O_3$, 0–2% $ZrO_2$, and 0.5–3% $TiO_2$ with, as an additional condition:

1%<$Li_2O$+$Na_2O$+$K_2O$<4%.

The disadvantage of these glasses is that they have an insufficient refractive index for certain applications.

FR-A-2,550,524 describes glasses whose compositions by weight are within the following ranges:

23–32% $SiO_2$, 4–7% $B_2O_3$, 0.5–3% $Al_2O_3$, 23–30% BaO, 15–30% PbO, 0.5–10% $TiO_2$, 5–20% $La_2O_3$, and 0–1% $Nb_2O_5$. Their properties include a refractive index higher than 1.730, an Abbe coefficient of at least 33, a density not exceeding 4.45 g/cm$^3$, and a thermal extrusion coefficient between 77 and 83×10$^{-7}$/°C. The disadvantage of these glasses is that they have too high a dilatation coefficient for some applications.

More recently, U.S. Pat. No. 5,162,826 described glasses having the following compositions by weight:

24–42% $SiO_2$, 3–7.5% $Al_2O_3$, 2–7.5% $B_2O_3$, 35–57% PbO, 0–2% $Li_2O$, 0–2% $Na_2O$, 0–3% $K_2O$, 0–8% $La_2O_3$, 0–2.5% $ZrO_2$, and 0–8% $TiO_2$, with conditions such that the sum $Li_2O$+$Na_2O$+$K_2O$ is less than 3.5% and that of $La_2O_3$+$ZrO_2$+$TiO_2$ is between 4 and 12%. These glasses are devoid of alkaline-earth oxides, and have a thermal extrusion coefficient slightly too low for some applications.

Therefore, there is a need to have available glasses with a group of improved properties appropriate for certain applications, such as the manufacture of multifocal photochromic lenses.

The invention aims to satisfy this need by providing glasses characterized by a group of original properties, particularly a refractive index higher than 1.740 and preferably between 1.740 and 1.770; a thermal expansion $\alpha$, between 25 and 300° C., between 65 and 70×10$^{-7}$/°C.; and a Littleton point not exceeding 635° C. but higher than 600° C. Moreover, the characteristics of viscosity and devitrification of the glass permit its industrial manufacture by known techniques of melting and forming. These glasses are suitable for the manufacture of optical lenses and, in particular, segments for multifocal lenses.

More specifically, the invention concerns glasses with the following composition, expressed in weight percent of oxides:

| | |
|---|---|
| $SiO_2$ | 23–32.0 |
| $Al_2O_3$ | 1.5–5.0 |
| $B_2O_3$ | 5–9.0 |
| PbO | 43–54.0 |
| $Li_2O$ | 0–0.5 |
| $Na_2O$ | 0–1.0 |
| $K_2O$ | 0–1.0 |
| with $Li_2O$ + $Na_2O$ + $K_2O$ | <1.0 |
| BaO + SrO | 4–9.0 |
| $TiO_2$ | 0–4.0 |
| $ZrO_2$ | 0–2.0 |
| $La_2O_3$ | 0–3.0 |
| $Nb_2O_5$ | 0–3.0 |
| $As_2O_3$ | 0–0.3 |
| $Sb_2O_3$ | 0–0.4 |
| with $ZrO_2$ + $La_2O_3$ + $Nb_2O_5$ | 1.5–4.0 |

In these glass compositions, the high refractive index of the glass can be obtained by a combination of oxides of lead, lanthanum, barium, strontium, zirconium, niobium, and possibly titanium. Lead oxide is the essential contributor for this property, and its content will be above 43%. In addition, this oxide causes a substantial drop in the viscosity of the glass, both at the melting temperatures and at the temperatures of the operation of sealing the segment glass onto the glass of the principal lens. However, lead oxide gives the glass a high density. Because of this, its content will not exceed 54%, and the increase in the refractive index will be accompanied by an addition of the other oxides listed above. In this connection, the titanium and zirconium oxides do not lead to so pronounced an increase in the density of the glass. However, the $TiO_2$ concentration will be kept below 4%, because this oxide has a negative effect on the dispersion of the glass. Similarly, $ZrO_2$ will not be present in a content of more than 2%, in order to limit the risks of devitrification of the glass, which would make it difficult to fabricate. It is important to note that zirconium oxide also improves the glass's chemical durability.

The oxides of barium, strontium, and lanthanum make it possible to increase the glass's refractive index without any deterioration in its dispersion characteristics. In addition, these oxides have a direct effect on the viscosity in the range of the intermediate viscosities, that is, in the vicinity of the softening point, and therefore at the temperatures at which the segment glass is sealed onto the glass of the principal lens. We have found that the objectives of the invention are attained if the total concentration of BaO+SrO is between 4 and 9%. It is preferable to use BaO rather than SrO. Lanthanum oxide will be present in a proportion of less than 3%, to prevent any tendency to devitrification, particularly when zirconium oxide is present in the composition. Moreover, $La_2O_3$ significantly increases the density of the glass.

Niobium oxide can be used advantageously, because it rapidly increases the refractive index of the glass and contributes to improving its durability. However, its content should not exceed 3%; beyond this threshold, the risks of devitrification of the glass become significant. In addition, the raw materials from which this oxide is obtained are particularly expensive, and therefore the impact on the final cost should be minimized.

To obtain the desired properties for the glass, particularly those influencing the refractive index, the dispersion, and the density of the glass, we have found that at least one of the oxides of niobium, zirconium, and lanthanum must be present in the glass composition, and that their sum should be at least 1.5%. On the other hand, to maintain a devitrification level compatible with the classic techniques of industrial manufacture, we have also found that the cumulative content of these three oxides should not exceed 4%.

The viscosity in the proximity of the softening point of the glass can be adjusted by manipulating the boron and aluminum oxides. Boron oxide is also necessary, because it lowers the viscosity at the melting temperatures of the glass and thereby facilitates its manufacture. In order to lower the Littleton point in the temperature range in question, while preserving a relatively low dilatation coefficient, boron oxide should be present at a concentration between 5 and 9%. The role of alumina on viscosity is opposite that of boron oxide. A minimum alumina content of 1.5% will be used, because this oxide significantly improves the chemical durability of the glass. This point is particularly critical for the type of compositions described here, in which the level of silica is relatively low. On the other hand, the alumina concentration must remain below 5%, so that it the desired range of Littleton temperatures is not exceeded.

The alkali metal oxides allow for lowering the viscosity of the glass, particularly in the vicinity of the Littleton point. However, these components have an important effect on dilatation. Given the stated objective, they must not be used at concentrations of more than 0.5% for lithium oxide or 1% for sodium and potassium oxides. In all cases, their cumulative content should not exceed 1%. When possible, it is preferable not to use alkali metal oxides.

Such a glass composition advantageously has traditional refining agents added to it, such as $As_2O_3$ and $Sb_2O_3$, which make it possible to obtain a glass free of gas inclusions.

Within the range of glass compositions cited above, there is a narrow subrange which can lead to a glass whose characteristics allow its use as a segment compatible with several photochromic glasses produced commercially by CORNING, Inc., specifically the glasses called PHOTOGRAY THIN & DARK™, PHOTOBROWN THIN & DARK™, PHOTOGRAY EXTRA™ and PHOTOBROWN EXTRA™, whose essential characteristics, outside of their photochromic properties, are

|  | "EXTRA" Glasses | "THIN & DARK" Glasses |
|---|---|---|
| Refractive index | 1.523 | 1.523 |
| Littleton temp. (° C.) | 665 | 634 |
| Thermal expansion coefficient ($\times 10^7$/° C.) | 63.5 | 62.2 |

The Littleton temperature corresponds to a viscosity of $10^{7.5}$ P for the glass. The thermal expansion coefficient is traditionally measured between 25 and 300° C.

The subrange of the segment glasses compatible with these two families of photochromic glasses has the following composition, expressed in terms of weight percent of oxides:

| | |
|---|---|
| $SiO_2$ | 23–28 |
| $Al_2O_3$ | 2–4 |
| $B_2O_3$ | 5.5–7.5 |
| PbO | 49–53 |
| BaO + SrO | 6–9 |
| $TiO_2$ | 2–3 |
| $ZrO_2$ | 0–0.5 |
| $La_2O_3$ | 0.5–2 |
| $Nb_2O_5$ | 0.5–2 |
| $As_2O_3$ | 0–0.2 |
| $Sb_2O_3$ | 0–0.3 |

The attached table gives nonlimiting examples of compositions, melted in the laboratory, illustrating the present invention. Typical raw materials for the glassmaking industry are weighed and mixed, before they are put into an oven in platinum crucibles with a capacity of about 1000 cm$^3$. Melting is generally performed at 1450° C. for about 3 hours. The glass, which is poured in bars and then annealed, is then characterized by the traditional techniques of measuring refractive index, Littleton temperature, and thermal expansion. It will be apparent to the expert that this procedure can easily be modified and adapted to industrial manufacturing conditions. In the table, "$T_L$" indicates the Littleton point expressed in °C., that is, the temperature at which the viscosity of the glass is $10^{7.5}$ poises; α is the coefficient of dilatation measured between 25 and 300° C., and expressed in multiples of $10^{-7}$/°C. Finally, $n_d$ is the refractive index.

The preferred example is example 1 of the attached table.

| | 1 | 2 | 3 | 4 | 5 | 6 | 7 | 8 | 9 | 10 |
|---|---|---|---|---|---|---|---|---|---|---|
| $SiO_2$ | 25.15 | 27.25 | 25.45 | 26.95 | 24.0 | 24.95 | 24.95 | 23.65 | 25.45 | 26.25 |
| $Al_2O_3$ | 3.7 | 2.0 | 3.0 | 3.7 | 3.2 | 3.7 | 3.7 | 3.7 | 4.5 | 3.5 |
| $B_2O_3$ | 6.4 | 6.0 | 6.4 | 6.4 | 8.0 | 6.4 | 6.4 | 6.4 | 6.4 | 6.0 |
| PbO | 50.9 | 50.7 | 50.9 | 45.0 | 50.9 | 50.9 | 50.9 | 52.0 | 50.9 | 50.9 |
| $Li_2O$ | 0 | 0 | 0 | 0.2 | 0 | 0 | 0 | 0 | 0.3 | 0 |

-continued

|  | 1 | 2 | 3 | 4 | 5 | 6 | 7 | 8 | 9 | 10 |
|---|---|---|---|---|---|---|---|---|---|---|
| $Na_2O$ | 0 | 0 | 0.5 | 0.5 | 0 | 0 | 0 | 0 | 0.1 | 0 |
| $K_2O$ | 0 | 0 | 0 | 0 | 0 | 0 | 0 | 0 | 0 | 0.5 |
| BaO | 8.0 | 8.0 | 8.0 | 8.0 | 8.0 | 8.0 | 8.0 | 8.0 | 5.0 | 7.0 |
| $La_2O_3$ | 1.7 | 1.5 | 1.7 | 2.5 | 1.75 | 0.5 | 2.5 | 1.7 | 2.8 | 1.7 |
| $TiO_2$ | 2.8 | 2.8 | 2.8 | 3.5 | 2.8 | 2.8 | 2.8 | 2.8 | 2.8 | 2.5 |
| $ZrO_2$ | 0 | 1.5 | 0.5 | 0.5 | 0 | 0 | 0 | 0 | 0.4 | 0.2 |
| $Nb_2O_5$ | 1.1 | 0 | 0.5 | 2.5 | 1.1 | 2.5 | 0.5 | 1.5 | 1.1 | 1.2 |
| $As_2O_3$ | 0.15 | 0.15 | 0.15 | 0.15 | 0.15 | 0.15 | 0.15 | 0.15 | 0.15 | 0.15 |
| $Sb_2O_5$ | 0.10 | 0.10 | 0.10 | 0.10 | 0.10 | 0.10 | 0.10 | 0.10 | 0.10 | 0.10 |
|  | 66.7 | 65.0 | 69.4 | 64.7 | 67.4 | 66.4 | 67.1 | 68.2 | 63.2 | 68.0 |
| $T_L$ | 617 | 624 | 606 | 621 | 602 | 617 | 618 | 612 | 608 | 612 |
| $n_d$ | 1.750 | 1.744 | 1.748 | 1.740 | 1.750 | 1.757 | 1.749 | 1.763 | 1.743 | 1.744 |

Note: The compositions are expressed in weight percent.

What is claimed is:

1. A glass composition having a refractive index higher than 1.740; a dilatation coefficient $\alpha$, between 25 and 300° C., between 65 and $70 \times 10^{-7}/°C$.; and a Littleton point not exceeding 635° C. but greater than 600° C. and having the following composition, expressed in weight percent of oxides:

| | |
|---|---|
| $SiO_2$ | 23–32.0 |
| $Al_2O_3$ | 1.5–5.0 |
| $B_2O_3$ | 5–9.0 |
| PbO | 43–54.0 |
| $Li_2O$ | 0–0.5 |
| $Na_2O$ | 0–1.0 |
| $K_2O$ | 0–1.0 |
| with $Li_2O + Na_2O + K_2O$ | <1.0 |
| BaO + SrO | 4–9.0 |
| $TiO_2$ | 0–4.0 |
| $ZrO_2$ | 0–2.0 |
| $La_2O_3$ | 0–3.0 |
| $Nb_2O_5$ | 0–3.0 |
| $As_2O_3$ | 0–0.3 |
| $Sb_2O_3$ | 0–0.4 |
| with $ZrO_2 + La_2O_3 + Nb_2O_5$ | 1.5–4.0. |

2. A glass composition according to claim 1, having the following composition, expressed in terms of weight percent of oxides:

| | |
|---|---|
| $SiO_2$ | 23–28 |
| $Al_2O_3$ | 2–4 |
| $B_2O_3$ | 5.5–7.5 |
| PbO | 49–53 |
| BaO + SrO | 6–9 |
| $TiO_2$ | 2–3 |
| $ZrO_2$ | 0–0.5 |
| $La_2O_3$ | 0.5–2 |
| $Nb_2O_5$ | 0.5–2 |
| $As_2O_3$ | 0–0.2 |
| $Sb_2O_3$ | 0–0.3. |

3. A corrective multifocal lens including a principal lens made of glass with a low refractive index and a segment fused to the principal lens, and having a high refractive index, wherein the segment is made of a glass according to claim 1 or 2.

4. Lens according to claim 3, wherein the principal lens has photochromic properties.

5. A segment for a multifocal corrective lens comprising the glass composition according to claim 1 or 2.

* * * * *